Jan. 20, 1931.  H. W. OSTER ET AL  1,789,411

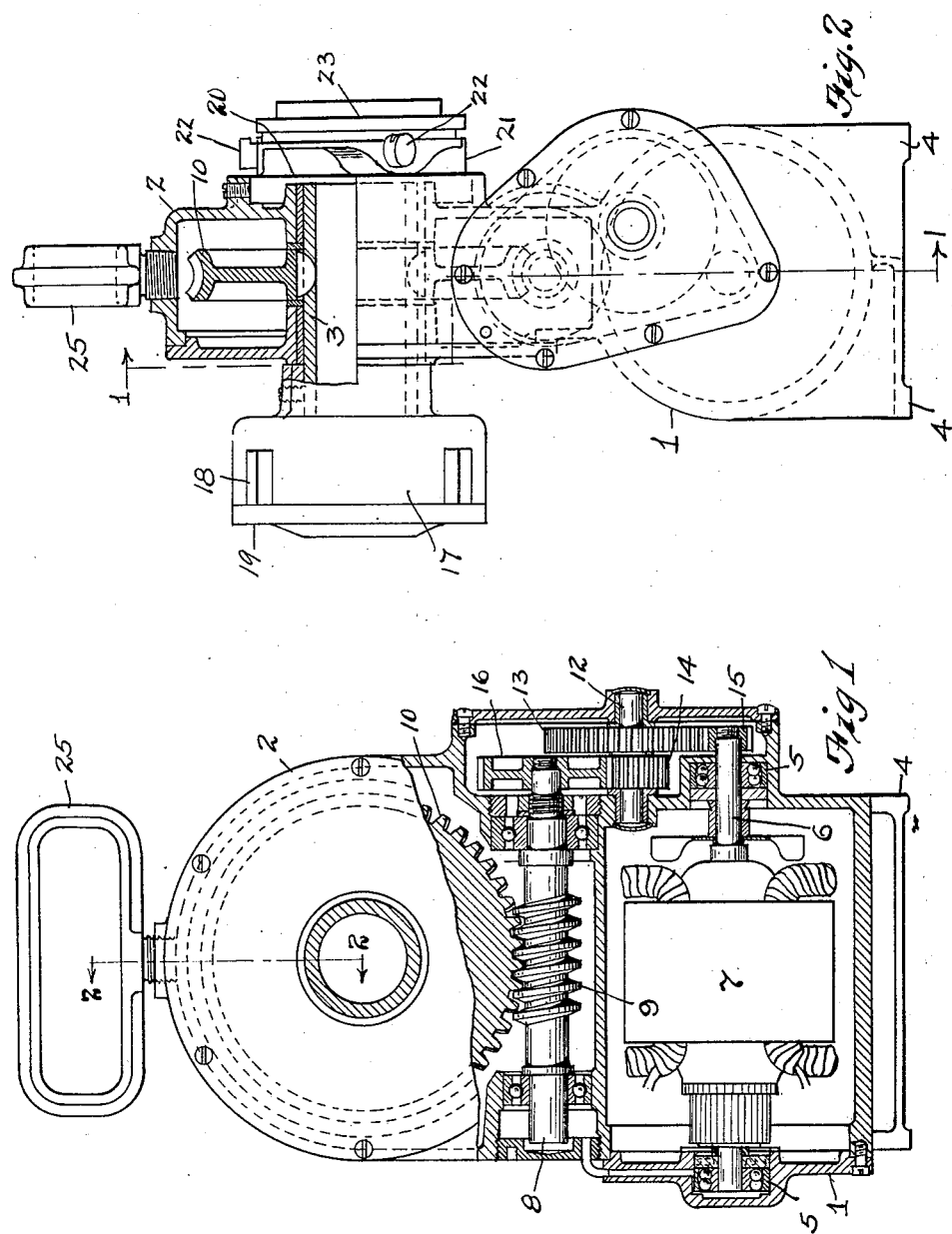

PORTABLE POWER DRIVEN THREADING TOOL

Filed March 10, 1924   2 Sheets-Sheet 2

INVENTORS
Herman W. Oster and
Glenn D. Sleeth.
BY
Fay, Oberlin & Fay
ATTORNEYS

Patented Jan. 20, 1931

1,789,411

UNITED STATES PATENT OFFICE

HERMAN W. OSTER AND GLENN D. SLEETH, OF CLEVELAND, OHIO, ASSIGNORS TO THE OSTER MANUFACTURING COMPANY, OF CLEVELAND, OHIO, A CORPORATION OF OHIO

PORTABLE POWER-DRIVEN THREADING TOOL

Application filed March 10, 1924. Serial No. 698,015.

The present improvements, relating, as indicated, to threading tools, have more particular regard to the provision of a portable power driven die head, one that will be sufficiently compact and light enough to permit its employment in the same manner as the familiar manually operated die stock. While such tool is designed primarily for threading pipe "on the job", it will be understood that such tool may be employed for any similar threading operation; also that while reference is thus made to the tool as a threading tool, the improvements apply to any similar rotating type of tool, as for example, pipe cutters and the like.

To the accomplishment of the foregoing and related ends, the invention, then, consists of the means hereinafter fully described and particularly pointed out in the claim, the annexed drawings and the following description setting forth in detail certain mechanism embodying the invention, such disclosed means constituting, however, but one of various mechanical forms in which the principle of the invention may be used.

In said annexed drawings:—

Figure 3:
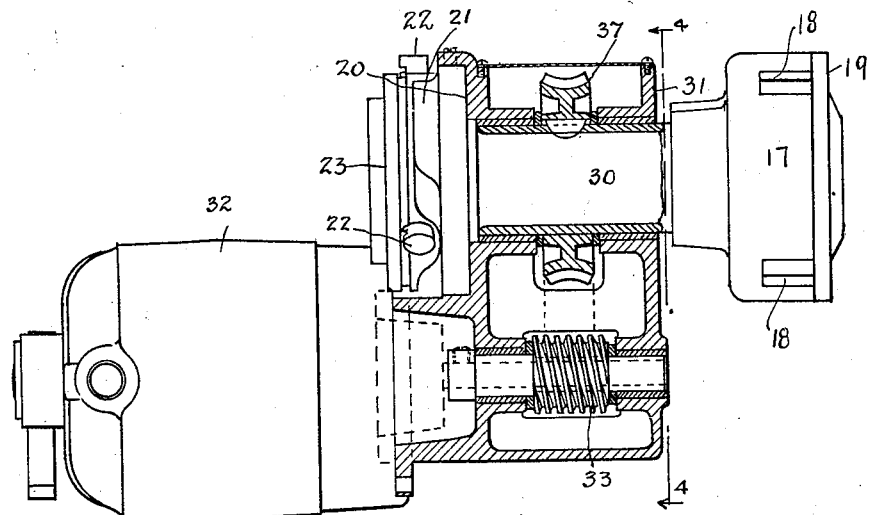
Figure 4:
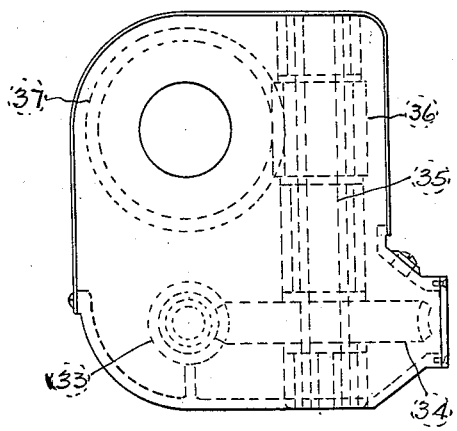

Fig. 1 is partly a front elevation and partly a transverse vertical section of one form of portable tool embodying our present improvements; Fig. 2 is a side elevation of the same with parts again shown in section; Fig. 3 is a view similar to that of Fig. 1, but showing a modified construction; and Fig. 4 is a view of such modified construction similar to that of Fig. 2.

Referring first of all to the construction shown in Figs. 1 and 2, the frame of the mechanism will be seen to comprise two principal parts, namely, a motor housing 1 and a second housing 2, wherein is rotatably mounted a tubular tool carrying shaft 3. Said motor housing is desirably provided with feet 4 whereon the device may be rested when not in use, suitable bearings 5 being provided in the end wall of such housing for the respective ends of the motor spindle 6. As illustrated, the motor 7 is an electric motor, but other forms of power than electricity may be employed, in which event the motor will be of appropriate form and construction.

It will be noted that the motor spindle 6 lies transversely of the axis of tubular shaft 3 in casing 2 and that journaled in suitable bearings in the lower portion of such last mentioned casing is a second spindle or shaft 8 that lies parallel with said motor spindle 6. Said shaft 8 is provided with a worm 9 that meshes with a worm gear 10 wholly contained within said housing 2 and keyed directly to said tubular shaft 3. Suitable reduction gearing is employed to connect motor spindle 6 with shaft 8, such gearing in the form illustrated consisting of an intermediate shaft 12 that carries a spur gear 13 and alongside thereof a spur pinion 14, a pinion 15 on spindle 6 meshing with such gear 13 and a gear 16 on shaft 8 meshing with such pinion 14.

Fixedly secured to one end of tubular shaft 3, so as to be rotated thereby, is a die stock or die head 17, of standard construction, save that the usual oppositely extending handles are omitted. It is considered unnecessary, for the purpose in hand, to describe the detail construction of such head other than to note that it is provided with chaser dies 18 that may be suitably positioned in the head by means of a cam plate 19. The opposite side of the casing 2, from that beyond which tubular shaft 3 projects thus to receive such die stock 17, is provided with a annular flange 20 within which fits the shell of a work centering device 21, which likewise is of standard construction, such device comprising a plurality of guides 22 that are opened or closed, as desired, by rotation of a cam or scroll plate 23.

Firmly secured to the upper portion of casing 2 is a handle 25 whereby the tool may be carried about and brought up to the work. In operation the work, as for example a piece of pipe, is firmly secured in a vise or equivalent holder. The tool is then brought up to the end of such pipe that requires to be threaded, so that the latter will lie within the tubular shaft 3 and in proximity to the dies 18 of the die head 17. The latter, it will be understood, have been previously adjusted to the proper diameter and as the tool is being thus placed on the work, the centering jaws 22 are moved inwardly into contact with such pipe. The motor 7 is now started up with the result that the tubular shaft 3 is caused to rotate, and thereby the die head 17. On the other hand, the housing 2 is held against rotation by firmly grasping the handle 25, or some convenient part of such housing, or of housing 1. At the same time sufficient pressure is placed on the tool longitudinally of the axis of shaft 3 to cause the dies 18 to properly engage with the end of the pipe. Once the dies take hold, no further pressure will of course be necessary.

In the modified construction shown in Figs. 3 and 4, we mount a tubular shaft 30 within a housing 31 in much the same fashion as shaft 3 is mounted within shaft 2. However, the motor housing 32 instead of being attached to the under side of such housing 31 extends laterally therefrom, as best shown in Fig. 3. The motor spindle is here directly connected with an alinged worm shaft 33, suitably journaled in the adjacent lower portion of housing 31, the worm on said shaft meshing with a worm gear 34 mounted on a vertical shaft 35. The latter carries a second worm 36 that meshes with a worm 37 keyed on to the tubular shaft 30 in the same fashion as worm 10 is keyed onto shaft 3 of the previously described construction. The construction and general operation of this modified form of our tool is indentical with that of the first described form. It will be noted, however, that the necessary reduction in speed between the motor spindle and the tubular shaft that carries the die head is here obtained through the medium of two sets of worms and worm gears in place of one such set and spur reduction gearing.

Other modes of applying the principle of our invention may be employed instead of the one explained, change being made as regards the mechanism herein disclosed, provided the means stated by the following claim or the equivalent of such stated means be employed.

We therefore particularly point out and distinctly claim as our invention:—

In a power-driven portable threading machine, in combination, a main casing, a motor and a motor-driven train of reduction gearing carried by the main casing, an auxiliary casing mounted on the end of the main casing, a sleeve rotatably mounted in the auxiliary casing, a die-stock with dies and a pipe guide mounted on opposite ends of said sleeve, a ring-gear fixed to the sleeve at a point between said pipe-guide and stock, and a pinion actuated by said train of gears disposed to engage said ring-gear when the auxiliary casing is in position on the main casing, the axis of the main casing extending substantially at right angles to the axis of said sleeve.

Signed by us this 7th day of March, 1924.
HERMAN W. OSTER.
GLENN D. SLEETH.